United States Patent [19]

Pipkins

[11] Patent Number: 4,944,978

[45] Date of Patent: Jul. 31, 1990

[54] PIRN MARKER SHEET AND METHOD FOR FORMING THE SAME

[76] Inventor: Alfred R. Pipkins, 3776 Court Dr., Theodore, Ala. 36582

[21] Appl. No.: 413,762

[22] Filed: Sep. 28, 1989

[51] Int. Cl.[5] .................................................. B32B 3/10

[52] U.S. Cl. ........................................ 428/43; 428/136; 206/820

[58] Field of Search .................... 428/43, 136; 206/820

[56] References Cited

U.S. PATENT DOCUMENTS

| | | | |
|---|---|---|---|
| 4,584,219 | 4/1986 | Baartmans | 428/42 |
| 4,619,851 | 10/1986 | Sasaki et al. | 428/40 |
| 4,661,189 | 4/1987 | Voy et al. | 156/248 |
| 4,690,720 | 9/1987 | Mack | 156/248 |

*Primary Examiner*—Alexander S. Thomas

*Attorney, Agent, or Firm*—Sixbey, Friedman, Leedom & Ferguson

[57] ABSTRACT

A sheet of removable pirn markers is provided which maybe fed through a printer, and then a row of interconnected pirn markers may be removed from the sheet by pulling outwardly on the first pirn marker in the row. Each pirn marker in the row has opposed sides defined by opposed arcuate cuts extending through the sheet, and the cuts are designed to create connection points at the ends of a line of joinder between pirn markers in the row. The end pirn markers in the row are connected to the sheet by a single, central connection point remote from the line of joinder between the end pirn marker and other pirn markers in the sheet.

12 Claims, 1 Drawing Sheet

PIRN MARKER SHEET AND METHOD FOR FORMING THE SAME

TECHNICAL FIELD

The present invention relates generally to circular markers for thread bearing cylinders or pirns, and more particularly to a pirn marker sheet construction which facilitates printing by a laser printer or similar means of a plurality of pirn markers which may then be separated from the sheet in a chain.

BACKGROUND ART

In the past, it has been a common practice to form either a web or a sheet of labels which can be printed as a group and then individually removed for use. U.S. Pat. No. 4,584,219 to H. R. Baantmans discloses such a web of labels which includes a web of carrier material with self-adhesive labels spaced-apart thereon. Sheets of adhesive labels are disclosed by U.S. Pat. Nos. 4,619.851 to Y. Sasaki et al, 4,661,189 to P. A. Vay et al. and 4,690,720 to J. B. Mack.

Prior label web or sheet structures have commonly employed a carrier sheet upon which a group of labels are adhesively but removably mounted, and such labels are designed for individual removal from the carrier sheet.

In the fiber industry, as thread is formed, it is wound on cylinders or bobbins called pirns, each of which is provided at the end with a plastic holder to receive a removable pirn marker. This pirn marker is conventionally a doughnut-shaped circular cardboard piece which is retained in the plastic holder by friction, and which travels with the pirn until the thread is removed. The pirn marker is printed to identify the thread, the date it was made and the machine and station it came from. Once the thread is removed from the pirn, the pirn marker is removed and the pirn is then ready for reuse.

Unlike conventional labels, pirn markers have no adhesive and thus cannot be supported by a separate carrier sheet. Instead, they are formed from a sheet of cardboard which is relatively stiff so that the resulting marker is of sufficient stiffness to be retained by friction in the plastic holder on the pirn.

DESCRIPTION OF THE INVENTION

It is a primary object of the present invention to provide a novel and improved pirn marker sheet and method for forming the same wherein a plurality of rows of pirn markers are formed on a stiff sheet which can be directed through a printer.

Another object of the present invention is to provide a novel and improved pirn marker sheet having a plurality of columns of interconnected pirn markers wherein each column may be easily removed as a unitary unit from the remainder of the sheet and the individual pirn markers may then be removed from the column for use.

A further object of the present invention is to provide a novel and improved pirn marker sheet having a plurality of columns of interconnected pirn markers which are defined by cuts in the sheet made at the periphery of each marker. These cuts are designed to permit effective feeding of the sheet through a printer and to facilitate subsequent removal of a column of markers from the sheet.

Yet another object of the present invention is to provide a novel and improved pirn marker sheet having a plurality of columns of pirn markers where the two end pirn markers in each column have a single connection point with the sheet at the respective end of the column. Each pirn marker in a column is joined to the next adjacent pirn marker or markers by spaced perforations cut through the sheet at the line of joinder. These spaced perforations provide a connection between the pirn markers in a column which is stronger than other single connection points connecting the column of pirn markers to the sheet.

Another object of the present invention is to provide a novel and improved pirn marker sheet having a plurality of columns of pirn markers with the two end pirn markers in each column having a single central connection point with the sheet at the respective end of the column. Two opposed, continuous arcuate cuts through the sheet on either side of central connection points define the end pirn markers. Each pirn marker intermediate the two end pirn markers is joined to a pirn marker at opposed top and bottom ends thereof by a line of spaced perforations cut through the sheet along the line of joinder. Each intermediate pirn marker is defined by two continuous, opposed arcuate cuts through the sheet which, at one end of the marker begin at the ends of the line of perforations and which terminate at the other end of the marker a slight distance from the ends of the line of perforations to create a connection point with the sheet at either end of the line of perforations. Each said arcuate cut terminates at a point where, if the cut were continued along the line of the arc, it would join the line of perforations.

BEST MODE FOR CARRYING OUT THE INVENTION

Figure 1:
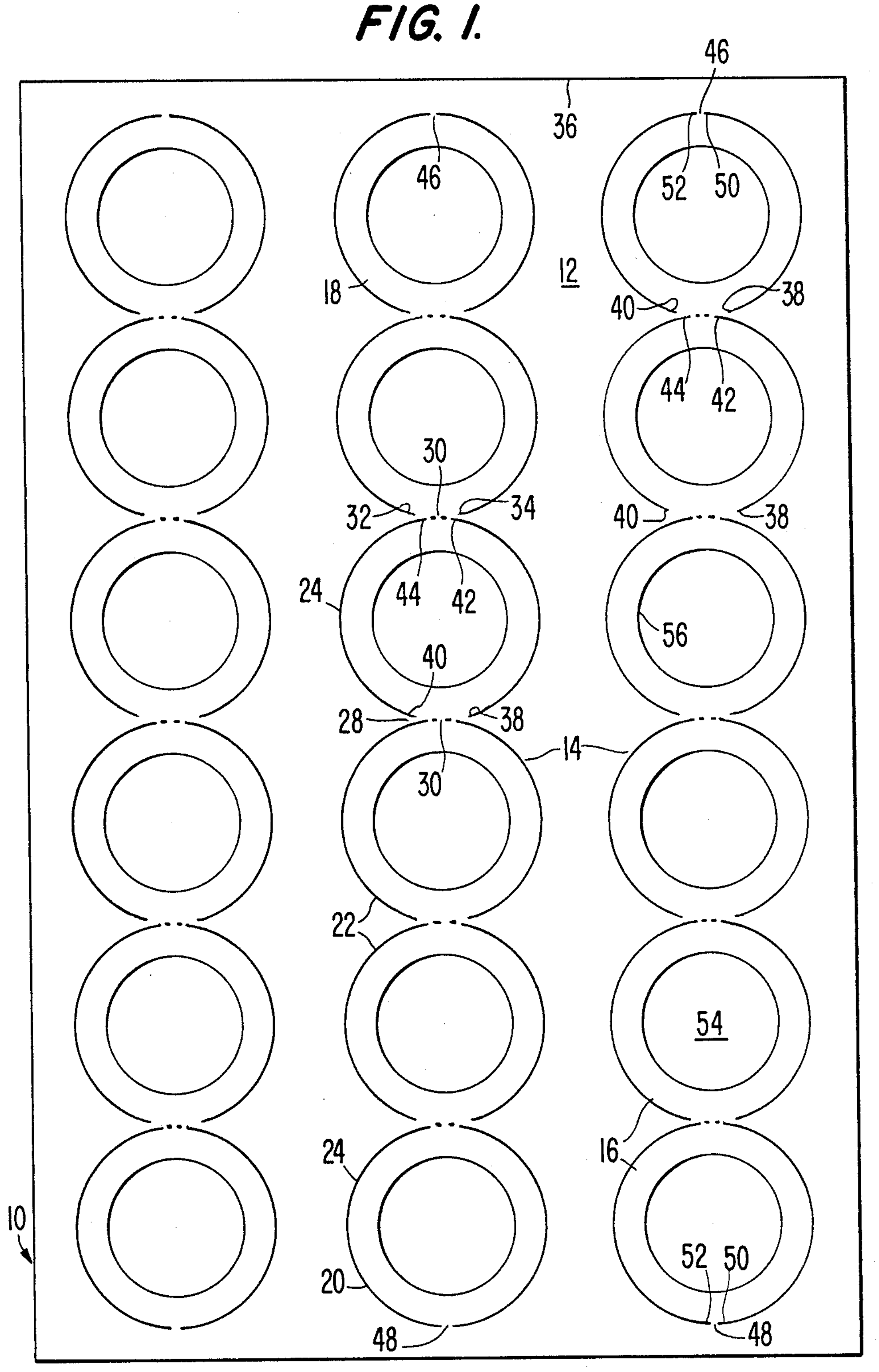
FIG. 1 is a plan view of the pirn marker sheet of the present invention.

Referring to FIG. 1, the pirn marker sheet of the present invention indicated generally at 10 consists of a sheet 12 of cardboard, posterboard or similar sheet material having sufficient flexibility to permit the sheet to pass through a printer, such as a laser printer, while being stiff enough to permit pirn markers formed from the sheet to be retained by friction in a plastic holder. The sheet 10 includes a plurality of columns or rows 14 formed of interconnected pirn markers 16 which are retained in the plane of the sheet. Each row includes end pirn markers 18 and 20 and a plurality of intermediate pirn markers 22, all of which are substantially circular in configuration.

Each pirn marker has a circular outer periphery, a significant portion of which is defined by two spaced, opposed arcuate cuts 24 and 26 which extend completely through the sheet 12. These arcuate cuts are unbroken and provide smooth side surfaces for the pirn marker to facilitate its insertion and retention by the plastic holder on a pirn.

Each intermediate pirn marker 22 is connected to two adjacent pirn markers by a juncture 28. A line of spaced perforations 30 extends along each juncture 28 with the perforations being cut through the sheet 12. A juncture connection point 32 and 34 is provided at the ends of each line of perforations.

The juncture connection points 32 and 34 connect two adjacent pirn markers to the sheet 12 and hold these pirn markers in the plane of the sheet during printing. Additionally, the juncture connection points are formed to facilitate detachment of a complete row 14 of interconnected pirn markers from the sheet 12 if the end pirn marker 18 closest to the leading edge 36 of the sheet is grasped and pulled outwardly from the plane of the sheet.

To form the juncture connection points 32 and 34 at a juncture 28 between two pirn markers, the arcuate cuts 24 and 26 for the pirn marker closest to the leading edge 36 terminate at first terminal points 38 and 40 spaced laterally and outwardly from the ends of the line of perforations 30. These first terminal points are positioned in close proximity to the ends of the line of perforations in a position where, if the cut were continued along an arcuate line past a first terminal point, it would join the line of perforations at one end thereof. The arcuate cuts 24 and 26 for the pirn marker farthest from the leading edge 36 terminate at second terminal points 42 and 44 at the ends of the line of perforations 30.

Each intermediate pirn marker 22 includes second terminal points 42 and 44 on a side closest to the leading edge 36 and first terminal points 38 and 40 on an opposite side furthest removed from the leading edge 36 of the sheet 12. Also, each end pirn marker 18 and 20 is joined to the sheet 12 by a single connection point 46 and 48 respectively. The arcuate cuts 24 and 26 for the end pirn markers 18 and 20 terminate at third terminal points 50 and 52 on either side of the single connection points 46 and 48.

To form the pirn marker sheet 10, an uncut sheet of material is fed into a roller type cutter of a conventional type which has raised blades to form the arcuate cuts 24 and 26 as well as the perforations 30. Also, the raised blades can be formed to remove the center from each pirn marker 16 as indicated at 54. This is normally done by providing a complete circular cut along a line 56. It is to be understood, however, that the pirn markers may take other forms than the substantially doughnut shape of FIG. 1. For example, the pirn markers may be formed Without holes, or in which cut 56 is a perforation allowing subsequent removal of the central portion to define a hole. In addition, the pirn markers may have holes which are substantially smaller than those of FIG. 1 and the holes may be offset to allow additional space for printed information, such as large multi-digit numbers.

The sheet 12 passes from the cutter in the form illustrated in FIG. 1 with a plurality of interconnected pirn markers 16 having open centers 54 connected to the sheet by connection points 32,34 and 46,48. The leading edge 36 of the sheet is fed into a laser or similar printer, and information is printed on each individual pirn marker 16. Then the sheet 10 is ready for use.

The pirn marker sheet 10 is specifically designed so that a user can grasp an end pirn marker 18 close to the leading edge 36 and by breaking the connection point 46 and pulling the end pirn marker upwardly from the sheet as viewed in FIG. 1, remove a complete column or row 14 of interconnected pirn markers from the sheet without tearing or breaking a pirn marker in the column. This is accomplished due to the novel construction of the connection points 32 and 34 which tear away in a direction in toward the perforations 30 due to the location of the termination points 38 and 40 and the fact that the line of perforations creates a connection between pirn markers which is stronger than the connection formed between pirn markers and the sheet 12 by connection points 32,34 and 46,48. Even where the strength between adjacent pirn markers is less than the strength between the pirn markers and the sheet, adjacent pirn markers will remain connected as they are pulled from the sheet due to the orientation of the forces associated with pulling the markers from the sheet 12. Since termination points are 38,40 are spaced outwardly from termination points 42,44; the tear from points 38,40 will not stray but rather will connect with arcuate portions 24,26 as the pirn markers are pulled from the sheet 12. No stress is placed on a pirn marker which would cause it to tear, and no outward tearing into the sheet 12 occurs.

Once a row pirn markers is removed, individual markers may be separated along the lines of perforations 30 and snapped into the holder at the end of a pirn.

INDUSTRIAL APPLICABILITY

The pirn marker sheet 10 is formed in a manner which will facilitate feeding of the sheet through a laser or similar printer so that all pirn markers on the sheet can be printed. Then a row of pirn markers may be easily removed from the sheet and individual pirn markers with smooth sidewalls are provided which can be removably snapped into a holder at the end of a pirn.

I claim:

1. A sheet of circular pirn markers which are removable from the remainder of the sheet as an interconnected row of pirn markers comprising a sheet of material having at least one row cf pirn markers formed therefrom and connected thereto, said row including first and second end pirn markers and a plurality of intermediate pirn markers therebetween, each end pirn marker being connected at one side thereof along a line of joinder to an intermediate pirn marker and at an opposite side thereof by a single connection point to the remainder of said sheet, each such end and intermediate pirn markers having opposed sides defined by continuous opposed arcuate cuts extending through said sheet.

2. The sheet of claim 1, wherein said opposed arcuate cuts terminate at spaced terminal points on opposite sides of each such pirn marker.

3. The sheet of claim 2, wherein each intermediate pirn marker is connected to each of two adjacent pirn markers along lines of joinder positioned between said terminal points.

4. The sheet of claim 3, wherein a line of spaced perforations is provided along each of said lines joinder.

5. The sheet of claim 4, wherein the opposed arcuate cuts for each said intermediate pirn marker extend from first spaced terminal points at the ends of said line of perforations on a first side of said intermediate pirn marker to second spaced terminal points each spaced laterally and outwardly from the end of said line of perforations at a second side of said intermediate pirn marker.

6. The sheet of claim 5, wherein each of said opposed arcuate cuts of said intermediate pirn markers, if extended beyond said second spaced terminal points, would extend into the opposite ends of a line of perforations.

7. The sheet of claim 6, wherein the opposed arcuate cuts for said first and second end pirn markers extend from opposite sides of said single connection point.

8. The sheet of claim 4, wherein at each line of juncture between an intermediate pirn marker and an adjacent pirn marker the opposed arcuate cuts for one of said pirn markers joined at the line of juncture extend from first spaced terminal points at the ends of said line of perforations and the opposed arcuate cuts for the remaining pirn marker extend from second spaced terminal points each spaced laterally and outwardly from the ends of said lines of perforation to form spaced juncture connection points between the remaining pirn marker and the sheet, one at each end of a line of perforations.

9. The sheet of claim 8, wherein said line of perforations is formed to provide a connection between two adjacent pirn markers which is stronger than the connection with said sheet provided by the juncture connection points.

10. The sheet of claim 9, wherein the opposed arcuate cuts for said first and second end pirn markers extend from opposite sides of said single connection point.

11. The sheet of claim 10, wherein each said second spaced terminal point is located in close proximity to an end of a line of perforations.

12. The sheet of claim 11, wherein an opening is formed in each said pirn marker.

* * * * *